United States Patent
Moorefield, Jr. et al.

(10) Patent No.: US 11,502,864 B2
(45) Date of Patent: Nov. 15, 2022

(54) ONBOARDING DEVICES FOR USE IN CONFERENCE ROOM

(71) Applicant: Cisco Technology, Inc., San Jose, CA (US)

(72) Inventors: Wayne Moorefield, Jr., Raleigh, NC (US); Vikas Vashisht, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 2 days.

(21) Appl. No.: 17/003,195

(22) Filed: Aug. 26, 2020

(65) Prior Publication Data

US 2020/0389333 A1 Dec. 10, 2020

Related U.S. Application Data

(62) Division of application No. 15/616,987, filed on Jun. 8, 2017, now Pat. No. 10,797,895.

(51) Int. Cl.
*H04L 12/18* (2006.01)
*H04L 65/403* (2022.01)
(Continued)

(52) U.S. Cl.
CPC ...... *H04L 12/1822* (2013.01); *H04L 12/1813* (2013.01); *H04L 12/1818* (2013.01);
(Continued)

(58) Field of Classification Search
CPC ............ H04L 12/1813; H04L 12/1818; H04L 12/1822; H04L 12/1827; H04L 12/185;
(Continued)

(56) References Cited

U.S. PATENT DOCUMENTS 6,865,371 B2  3/2005  Salonidis et al.
8,095,120 B1 * 1/2012  Blair ..................... H04M 3/562
                                                    455/518
(Continued)

FOREIGN PATENT DOCUMENTS

WO     2016149473 A1    9/2016

OTHER PUBLICATIONS

Da, Bin, et al. "Area Restricted Ad-hoc Network system based on Near Field Communication technology." 2015 IEEE Asia Pacific Conference on Wireless and Mobile (APWiMob). IEEE, 2015. (Year: 2015).*

(Continued)

*Primary Examiner* — Vivek Srivastava
*Assistant Examiner* — William C McBeth
(74) *Attorney, Agent, or Firm* — Edell, Shapiro & Finnan, LLC

(57) ABSTRACT

A method performed at a server configured to onboard devices in a conference room includes: receiving a log-in request from a user device; receiving a request from the user device for a first activation code for activating devices for use in the conference room; transmitting the first activation code to the user device; receiving a first request from a first device in the conference room for authorization to be used in the conference room, the first request including a second activation code; determining whether the second activation code matches the first activation code; if the second activation code matches the first activation code, authorizing the first device for use in the conference room; and if the second activation code does not match the first activation code, denying the first device for use in the conference room.

20 Claims, 13 Drawing Sheets

(51) Int. Cl.
*G06F 3/0482* (2013.01)
*H04N 7/15* (2006.01)
*H04M 3/56* (2006.01)

(52) U.S. Cl.
CPC .......... *H04L 65/403* (2013.01); *G06F 3/0482* (2013.01); *H04M 3/56* (2013.01); *H04N 7/15* (2013.01)

(58) Field of Classification Search
CPC ... H04L 65/403; H04L 65/1069; H04L 63/10; H04L 67/104; H04L 67/1044; H04L 67/1046; H04L 67/16; H04L 65/4038; H04L 65/4046; H04L 65/4053; H04L 67/1051; H04M 3/56; H04M 3/567; H04N 7/15; H04N 7/152; H04N 7/155; H04W 4/50; H04W 4/80; H04W 8/005; H04W 76/10; H04W 76/15; H04W 76/18; H04W 84/18
See application file for complete search history.

(56) References Cited

U.S. PATENT DOCUMENTS

| | | | |
|---|---|---|---|
| 8,553,625 | B2 | 10/2013 | Shao et al. |
| 9,491,237 | B1 | 11/2016 | Garg et al. |
| 2001/0049283 | A1* | 12/2001 | Thomas ............ H04M 3/56 370/260 |
| 2002/0103864 | A1 | 8/2002 | Rodman et al. |
| 2003/0060168 | A1 | 3/2003 | Teibel |
| 2004/0024912 | A1 | 2/2004 | Fukao et al. |
| 2005/0114520 | A1 | 5/2005 | White et al. |
| 2005/0180343 | A1 | 8/2005 | Van Valkenburg |
| 2007/0112942 | A1* | 5/2007 | Moquin ............ H04L 67/51 370/254 |
| 2007/0241945 | A1* | 10/2007 | Moorer ............ H04L 67/16 341/50 |
| 2007/0282748 | A1* | 12/2007 | Saint Clair ......... H04L 41/0806 705/51 |
| 2009/0111444 | A1 | 4/2009 | Sassi |
| 2009/0210490 | A1 | 8/2009 | Hawkins et al. |
| 2010/0235523 | A1 | 9/2010 | Garcia et al. |
| 2010/0246448 | A1 | 9/2010 | Krantz et al. |
| 2011/0004653 | A1 | 1/2011 | Cavill et al. |
| 2012/0023265 | A1 | 1/2012 | Liao |
| 2012/0155643 | A1 | 6/2012 | Hassan et al. |
| 2012/0202428 | A1* | 8/2012 | Mirbaha ............ H04L 12/185 455/41.2 |
| 2012/0214416 | A1 | 8/2012 | Kent et al. |
| 2012/0322384 | A1 | 12/2012 | Zerr et al. |
| 2013/0162753 | A1 | 6/2013 | Hendrickson et al. |
| 2013/0191896 | A1 | 7/2013 | Adderly et al. |
| 2014/0045472 | A1 | 2/2014 | Sharma et al. |
| 2014/0047487 | A1* | 2/2014 | Guedalia ............ H04W 4/80 725/80 |
| 2014/0073300 | A1 | 3/2014 | Leeder et al. |
| 2014/0108506 | A1 | 4/2014 | Borzycki et al. |
| 2014/0179230 | A1* | 6/2014 | Sydir ............ H04W 4/025 455/41.2 |
| 2014/0235170 | A1 | 8/2014 | Zhang et al. |
| 2014/0237015 | A1* | 8/2014 | Bruins ............ H04W 52/0209 709/201 |
| 2014/0245173 | A1 | 8/2014 | Knodt et al. |
| 2014/0245398 | A1* | 8/2014 | Son ............ H04W 4/08 726/4 |
| 2014/0267559 | A1 | 9/2014 | Krantz et al. |
| 2014/0313282 | A1 | 10/2014 | Ma et al. |
| 2015/0095933 | A1 | 4/2015 | Blackburn et al. |
| 2015/0139044 | A1* | 5/2015 | Maski ............ H04L 65/403 370/261 |
| 2015/0244539 | A1 | 8/2015 | Ickman et al. |
| 2015/0245202 | A1 | 8/2015 | Patil et al. |
| 2015/0334245 | A1 | 11/2015 | Lin et al. |
| 2015/0373123 | A1 | 12/2015 | Warrick et al. |
| 2015/0381594 | A1 | 12/2015 | Venkatesan et al. |
| 2016/0043962 | A1* | 2/2016 | Kim ............ H04W 4/80 709/224 |
| 2016/0134428 | A1 | 5/2016 | Ouyang et al. |
| 2016/0323863 | A1 | 11/2016 | Park et al. |
| 2016/0373490 | A1 | 12/2016 | Sedar et al. |
| 2017/0006162 | A1 | 1/2017 | Bargetzi et al. |
| 2017/0012959 | A1 | 1/2017 | Sierra et al. |
| 2017/0013035 | A1 | 1/2017 | Baldwin |
| 2017/0054874 | A1 | 2/2017 | Oe |
| 2017/0094697 | A1 | 3/2017 | Zdepski et al. |
| 2017/0149771 | A1* | 5/2017 | Vincent ............ H04W 12/06 |
| 2017/0264446 | A1 | 9/2017 | Rose et al. |
| 2018/0227128 | A1 | 8/2018 | Church et al. |

OTHER PUBLICATIONS

Chakrabarti, Satyajit, et al. "A remotely controlled Bluetooth enabled environment." First IEEE Consumer Communications and Networking Conference, 2004. CCNC 2004 . . . IEEE, 2004. (Year: 2004).*

* cited by examiner

| MASTER | SLAVE | CONFERENCE ROOM DEVICE NAME/ID | LOCATION |
|---|---|---|---|
| ○ | ○ | DEVICE A | ROOM 104 |
| ○ | ○ | DEVICE B | ROOM 104 |
| ○ | ○ | DEVICE C | ROOM 104 |
| ○ | ○ | DEVICE D | ROOM 104 |
| ○ | ○ | DEVICE E | ROOM 120 |
| ○ | ○ | DEVICE F | ROOM 120 |
| ○ | ○ | DEVICE G | ROOM 150 |

FIG.6A

| MASTER | SLAVE | CONFERENCE ROOM DEVICE NAME/ID | LOCATION |
|---|---|---|---|
| ● | ○ | DEVICE A | ROOM 104 |
| ○ | ● | DEVICE B | ROOM 104 |
| ○ | ● | DEVICE C | ROOM 104 |
| ○ | ○ | DEVICE D | ROOM 104 |
| ○ | ○ | DEVICE E | ROOM 120 |
| ○ | ○ | DEVICE F | ROOM 120 |
| ○ | ○ | DEVICE G | ROOM 150 |

FIG.6B

ONBOARDING DEVICES FOR USE IN CONFERENCE ROOM

CROSS REFERENCE TO RELATED APPLICATIONS

This application is a divisional of U.S. patent application Ser. No. 15/616,987, filed Jun. 8, 2017, and entitled "Onboarding Devices for use in Conference Room," the entire contents of which are hereby incorporated by reference.

TECHNICAL FIELD

The present disclosure relates to onboarding devices for use in a conference room.

BACKGROUND

Today on-boarding/activating devices for use in a conference room can be cumbersome. It typically involves a user requesting activation credential/code from a remote server and then manually entering the activation code on the device(s) to be activated. The entry of activation code can be performed by keying in the code or using a Quick Response (QR) code or other means. The process needs to be repeated for every device intended to be used in the conference room. The task is even more cumbersome if multiple devices that belong to the same room need to be activated and grouped together. The current onboarding process includes several manual steps and upfront planning, including knowing what devices are needed for a meeting and knowing where the needed devices are located.

BRIEF DESCRIPTION OF THE DRAWINGS

FIG. 6A illustrates a user interface screen displayed on a user device showing information of conference room devices, according to an example embodiment.

FIG. 6B illustrates a user interface screen displayed on a user device showing user selections of conference room devices, according to an example embodiment.

DESCRIPTION OF EXAMPLE EMBODIMENTS

Overview

Figure 1:
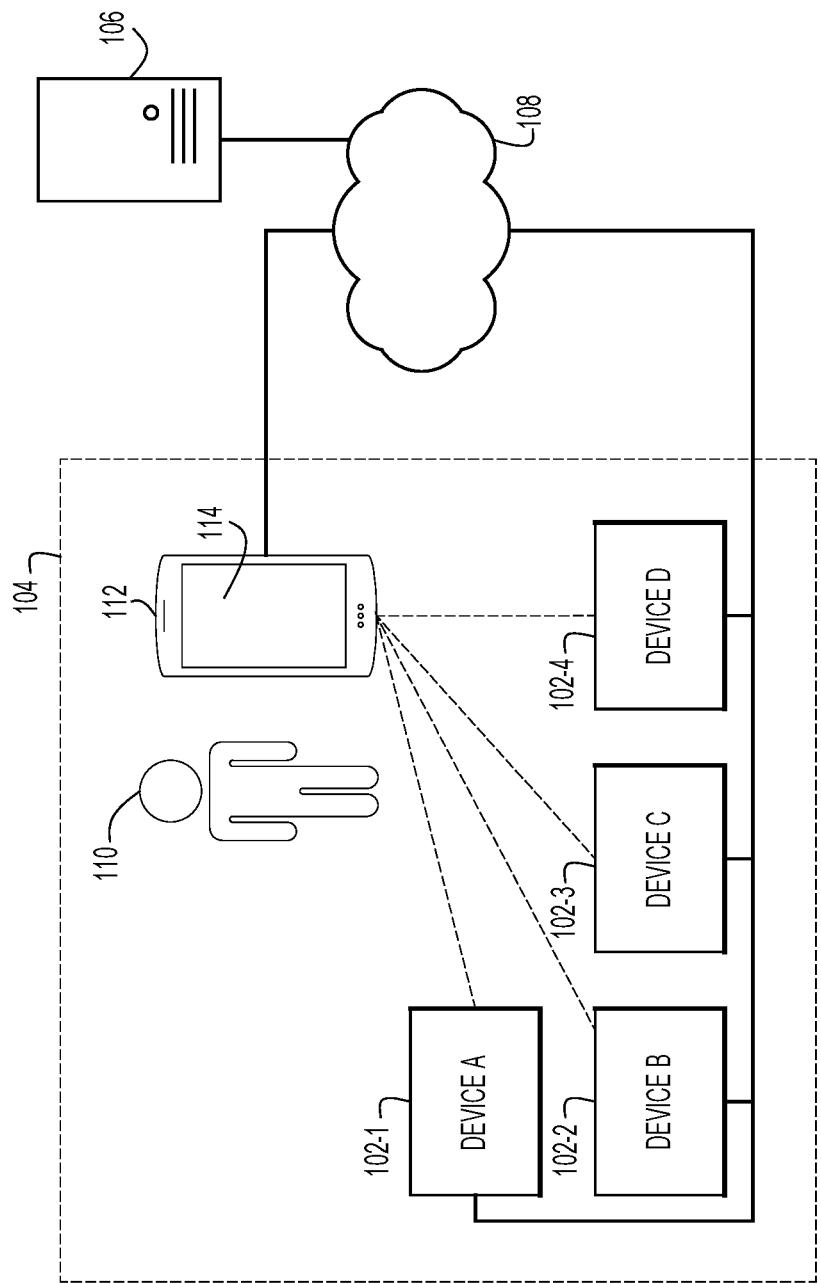
FIG. 1 depicts a conference room management system according to an example embodiment.

In one embodiment, a method is provided in which a user employs a user device running an application to set up a conference room for a conference meeting. Each of the conference room devices is capable of wirelessly connecting to each other. The user device running the application can receive a first user input to select a first one of the plurality of devices in the conference room. In response to the first user input, the user device connects to the first one of the plurality of devices. The user device then receives a second user input selecting a second one of the plurality of devices in the conference room such that the first one of the plurality of devices connects to the second one of the plurality of devices to form an ad hoc group. The user device logs into a remote server to receive an activation code for the ad hoc group, and sets up the first one and the second one of the plurality of devices for use in the conference room by forwarding the activation code to the first one of the plurality of devices to enable the first one of the plurality of devices to forward the activation code to the second one of the plurality of devices. The activation code enables the first one and the second one of the plurality of devices to individually perform an authorization process with a remote server.

Example Embodiments

Presented herein are devices and methods to simplify the process of activating devices for use in a conference room. A user responsible for setting up a conference room for a conference meeting may carry a user device and walk into a conference room. The user device runs an application to display a plurality of devices available for use in the conference room. Each of the plurality of devices is capable of wirelessly connecting to each other. The user can select one of the plurality of devices displayed on the user device as a master node and the user device connects to the selected device. The user then selects at least one other device in the conference room to be used in the meeting and the master node wirelessly connects to the at least one other device to form an ad hoc group. The other device acts as a slave node in the ad hoc group. The user may give a name for the room/ad hoc group. The user then uses the user device running the application to log into a remote server in order to acquire an activation code for the ad hoc group or an activation code for each of the conference room devices in the ad hoc group. The user device forwards the activation code(s) to the master node, which in turn forwards a corresponding activation code to the at least one other device (slave node) in the ad hoc group. After receiving its activation code, each of the master node and the at least one other slave node individually performs an authorization process with the remote server using its activation code. Once the authorization process concludes, the remote server sends a notification to the user device indicating whether the master node and/or the at least one slave node is authorized for use in the conference room. In one embodiment, each of the conference room devices in the ad hoc group may report its activation status (i.e., whether it has been authorized for use in the conference meeting) to the user device.

Reference is now made to FIG. 1 for a more detailed description of the above-described system and related methods. FIG. 1 depicts a conference room management system 100 according to an example embodiment. The system 100 includes a plurality of conference room devices 102-1 (Device A), 102-2 (Device B), 102-3 (Device C), and 102-4 (Device D) (collectively 102) located in a conference room 104. Although four conference room devices are shown in FIG. 1, it is to be understood that more or less than four devices may be present in the conference room 104. The conference room devices 102 may be electronic blackboards, electronic whiteboards, electronic projectors, flat screen displays, speakers, microphones, headsets, cameras, desktop computers, laptop computers, tablets, endpoints, and other devices generally to be used for an audio or video conference. For example, Device A is a video conference endpoint device, Device B is a whiteboard, Device C is a microphone, and Device D is a speaker. Each of the conference room devices 102 is capable of wirelessly connecting to each other. The conference room management system 100 further includes a remote server 106, which is located outside of the conference room 104. Each of the conference room devices 102 may connect to the remote server 106 via a network 108. To activate/onboard one or more conference room devices for use in a meeting, a user 110 may bring a user device 112, e.g., a mobile device, and walk into the conference room 104. The user may start a conference room management application 114 on the user device 112 for activating conference room devices 102 for use in the conference room 104.

Figure 2:
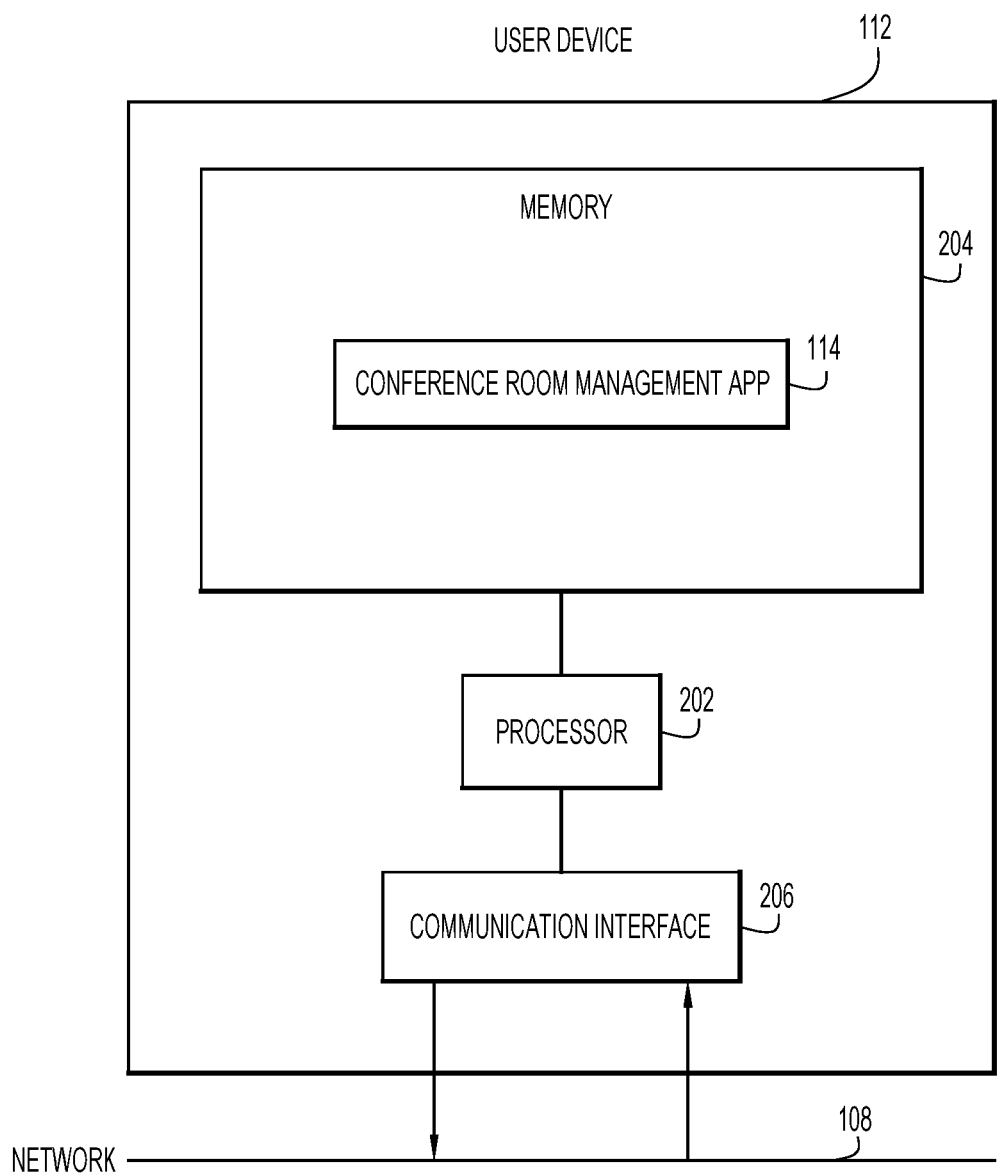
FIG. 2 depicts a block diagram of a user device for activating conference room devices, according to an example embodiment.

FIG. 2 depicts a block diagram of the user device 112 for activating/onboarding conference room devices, according to an example embodiment. The user device 112 includes a processor 202, a memory 204, and a communication interface 206. The processor 202 may be a microprocessor or microcontroller (or multiple instances of such components) that is configured to execute program logic instructions (i.e., software) for carrying out various operations and tasks described herein. For example, the processor 202 is configured to execute instructions for the conference room management application 114 stored in the memory 204. The conference room management application 114 is configured to manage conference room devices 102 and performs operations such as scanning to discover conference room devices near the user device 112, displaying a list of available conference room devices for the user 110, receiving user inputs selecting conference room devices for use in a particular conference, logging into and communicating with the remote server 106 to an acquire activation code for selected conference room devices. Further descriptions of operations performed by the processor 202 when executing instructions stored in the memory 204 will be provided below.

The memory 204 may include read only memory (ROM), random access memory (RAM), magnetic disk storage media devices, optical storage media devices, flash memory devices, electrical, optical or other physical/tangible memory storage devices.

The functions of the processor 202 may be implemented by logic encoded in one or more tangible (non-transitory) computer-readable storage media (e.g., embedded logic such as an application specific integrated circuit, digital signal processor instructions, software that is executed by a processor, etc.), wherein the memory 204 stores data used for the operations described herein and stores software or processor executable instructions that are executed to carry out the operations described herein.

The conference room management application 114 may take any of a variety of forms, so as to be encoded in one or more tangible/non-transitory computer readable memory media or storage device for execution, such as fixed logic or programmable logic (e.g., software/computer instructions executed by a processor), and the processor 202 may be an application specific integrated circuit (ASIC) that comprises fixed digital logic, or a combination thereof.

For example, the processor 202 may be embodied by digital logic gates in a fixed or programmable digital logic integrated circuit, which digital logic gates are configured to execute the conference room management application 114. In general, conference room management application 114 may be embodied in one or more computer-readable storage media encoded with software comprising computer executable instructions and when the software is executed operable to perform the operations described herein.

The communication interface 206 is configured to transmit signals to or receive signals from the network 108 or from one or more of the conference room devices 102, for the user device 112. In one example, the communication interface 206 is a wireless transceiver. For example, the communication interface 206 may broadcast a scan signal to and receive response signals from nearby conference room devices 102. In another example, the communication interface 206 may receive beacons from nearby conference room devices 102. Further, the communication interface 206 may transmit login information or request for an activation code(s) to the remote server 106 and receives login confirmation or activation code(s) from the remote server 106.

The user device 112 may take the form of a SmartPhone, tablet computer, laptop computer, or other suitable mobile computing device having computing and wireless network connectivity capabilities.

Figure 3:
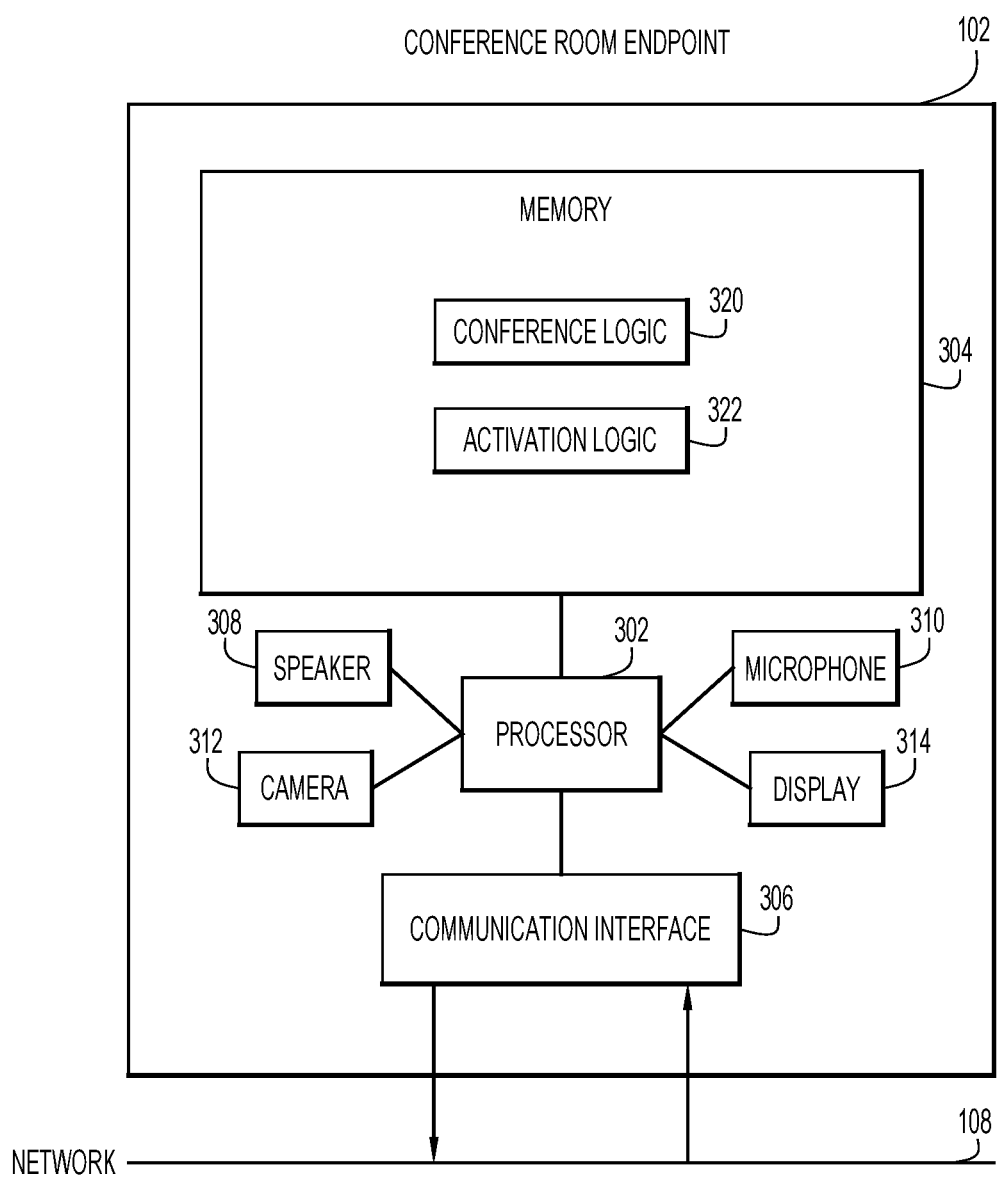
FIG. 3 depicts a block diagram of a conference room endpoint according to an example embodiment.

FIG. 3 depicts a block diagram of an example conference endpoint device 102 according to an embodiment. As explained above, a conference room device 102 may be other types electronic devices that can employed in a conference. For example, other than an endpoint device, the conference room devices 102 may be blackboards, whiteboards, projectors, flat screen displays, speakers, microphones, headsets, cameras, or in general any devices that can be used in an in-person or on-line meeting. As shown in FIG. 3, the conference room endpoint 102 includes a processor 302, a memory 304, a communication interface 306, and one or more of a speaker 308, a microphone 310, a camera 312, or a display 314. The processor 302 is a microprocessor or microcontroller that is configured to execute program logic instructions (i.e., software) for carrying out various operations and tasks described in this disclosure. For example, the processor 302 is configured to execute instructions for conference logic 320 stored in the memory 304 to participate in an on-line conference with other conference room devices. In one embodiment, the processor 302 is further configured to execute instructions for activation logic 322 stored in the memory 304 to perform an authorization process with the remote server 106. Further description of the operations performed by the processor 302 executing instructions stored in the memory 304 will be provided below.

The memory 304 may include ROM, RAM, magnetic disk storage media devices, optical storage media devices, flash memory devices, electrical, optical or other physical/tangible memory storage devices.

The functions of the processor 302 may be implemented by logic encoded in one or more tangible (non-transitory) computer-readable storage media (e.g., embedded logic such as an application specific integrated circuit, digital signal processor instructions, software that is executed by a processor, etc.), wherein the memory 304 stores data used for the operations described herein and stores software or processor executable instructions that are executed to carry out the operations described herein.

The conference logic 320 and the activation logic 322 may take any of a variety of forms, so as to be encoded in one or more tangible/non-transitory computer readable memory media or storage device for execution, such as fixed logic or programmable logic (e.g., software/computer instructions executed by a processor), and the processor 302 may be an ASIC that comprises fixed digital logic, or a combination thereof.

For example, the processor 302 may be embodied by digital logic gates in a fixed or programmable digital logic integrated circuit, which digital logic gates are configured to perform the conference logic 320 and the activation logic 322. In general, these logics may be embodied in one or more computer-readable storage media encoded with software comprising computer executable instructions and when the software is executed operable to perform the operations described herein.

The communication interface 306 is configured to transmit signals to or receive signals from the network 108 for the conference room endpoint device 102. Likewise, communication interface 306 is configured to transmit signals to or receive signals from other conference room device(s) 102 or user device 112. For example, the communication interface 306 receives a scan signal transmitted from the user device 112 and transmits a response signal to the user device 112 according to instructions from the processor 302. Further, the communication interface 306 may receive other signals from the user device 112, e.g., signals designating the conference room device as a master node of an ad hoc group, signals indicating members or identifier/name of an ad hoc group, signals indicating an activation code that enables the conference room endpoint 102 to perform an authorization process with the remote server 106, etc. In addition, the communication interface 306 may transmit signals to the remote server 106 based on instructions from the processor 302 to be authorized for use in a conference.

The conference room endpoint device 102 may include one or more of a speaker 308, a microphone 310, a camera 312, or a display 314, or other devices that is useful for a user in conducting a conference. For example, the speaker 308 is coupled to processor 302 and configured to emit audio during a communication session. The microphone 310 is coupled to processor 302 and configured to detect audio during a communication session. The camera 312 is coupled to processor 302 and configured to capture images or video during a communication session. The display 314 is coupled to processor 302 and configured to display images or data, such as presentation materials used in an on-line conference. The display 314 may be a flat screen or a touch screen that allows users to draw or write on it during a collaboration session in the conference meeting. It is to be understood that there may be one or more additional processing ASICs connected between the speaker, camera, microphone and/or display and the processor 302 to facilitate the respective functions of those components and interaction with the processor 302. Those processing ASICs are omitted in FIG. 3 for simplicity.

Figure 4:
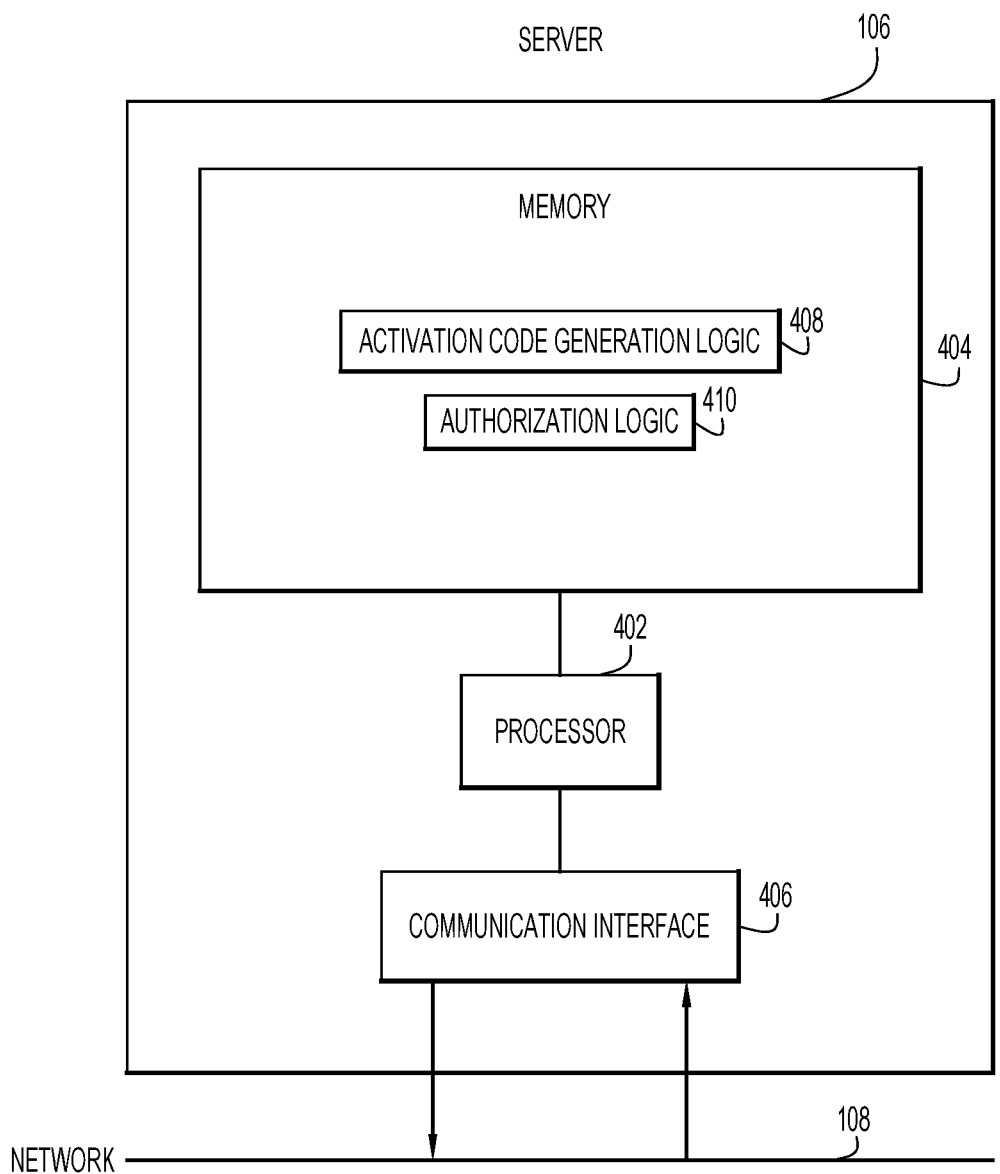
FIG. 4 depicts a block diagram of a remote server for authorizing conference room devices for use in a conference room, according to an example embodiment.

FIG. 4 depicts a block diagram of the remote server 106 for authorizing conference room devices for use in a conference room, according to an example embodiment. The remote server 106 includes a processor 402, a memory 404, and a communication interface 406. The processor 402 may be a microprocessor or microcontroller (or multiple instances of such components) that is configured to execute program logic instructions (i.e., software) for carrying out various operations and tasks described herein. For example, the processor 402 is configured to execute instructions for activation code generation logic 408 stored in the memory 404 to generate an activation code(s) for activating conference room devices to be used in a conference/communication session. Further, the processor 402 is configured to execute instructions for authorization logic 410 stored in the memory 404 to grant or deny a request of a conference room device for authorization to be used in a communication session or to send a notification to a user device 112 indicating whether a particular authorization is approved. Further descriptions of the operations performed by the processor 402 when executing instructions stored in the memory 404 are provided below.

The memory 404 may include ROM, RAM, magnetic disk storage media devices, optical storage media devices, flash memory devices, electrical, optical or other physical/tangible memory storage devices.

The functions of the processor 402 may be implemented by logic encoded in one or more tangible (non-transitory) computer-readable storage media (e.g., embedded logic such as an application specific integrated circuit, digital signal processor instructions, software that is executed by a processor, etc.), wherein the memory 404 stores data used for the operations described herein and stores software or processor executable instructions that are executed to carry out the operations described herein.

The activation code generation logic 408 and the authorization logic 410 may take any of a variety of forms, so as to be encoded in one or more tangible/non-transitory computer readable memory media or storage device for execution, such as fixed logic or programmable logic (e.g., software/computer instructions executed by a processor), and the processor 402 may be an ASIC that comprises fixed digital logic, or a combination thereof.

For example, the processor 402 may be embodied by digital logic gates in a fixed or programmable digital logic integrated circuit, which digital logic gates are configured to perform the activation code generation logic 408 and the authorization logic 410. In general, the activation code generation logic 408 and the authorization logic 410 may be embodied in one or more computer-readable storage media encoded with software comprising computer executable instructions and when the software is executed operable to perform the operations described herein.

The communication interface 406 is configured to transmit signals to or receive signals from the network 108 for the remote server 106. In one example, the communication interface 406 may take the form of one or more network interface cards. For example, the communication interface 406 may receive login information or a request for activation code from a user device 112 and transmit login confirmation or denial information or an activation code to the user device 112 via network 108. Further the communication interface 406 may receive request for authorization from and transmit authorization approval or denial information to a conference room device 102.

Figure 5A:
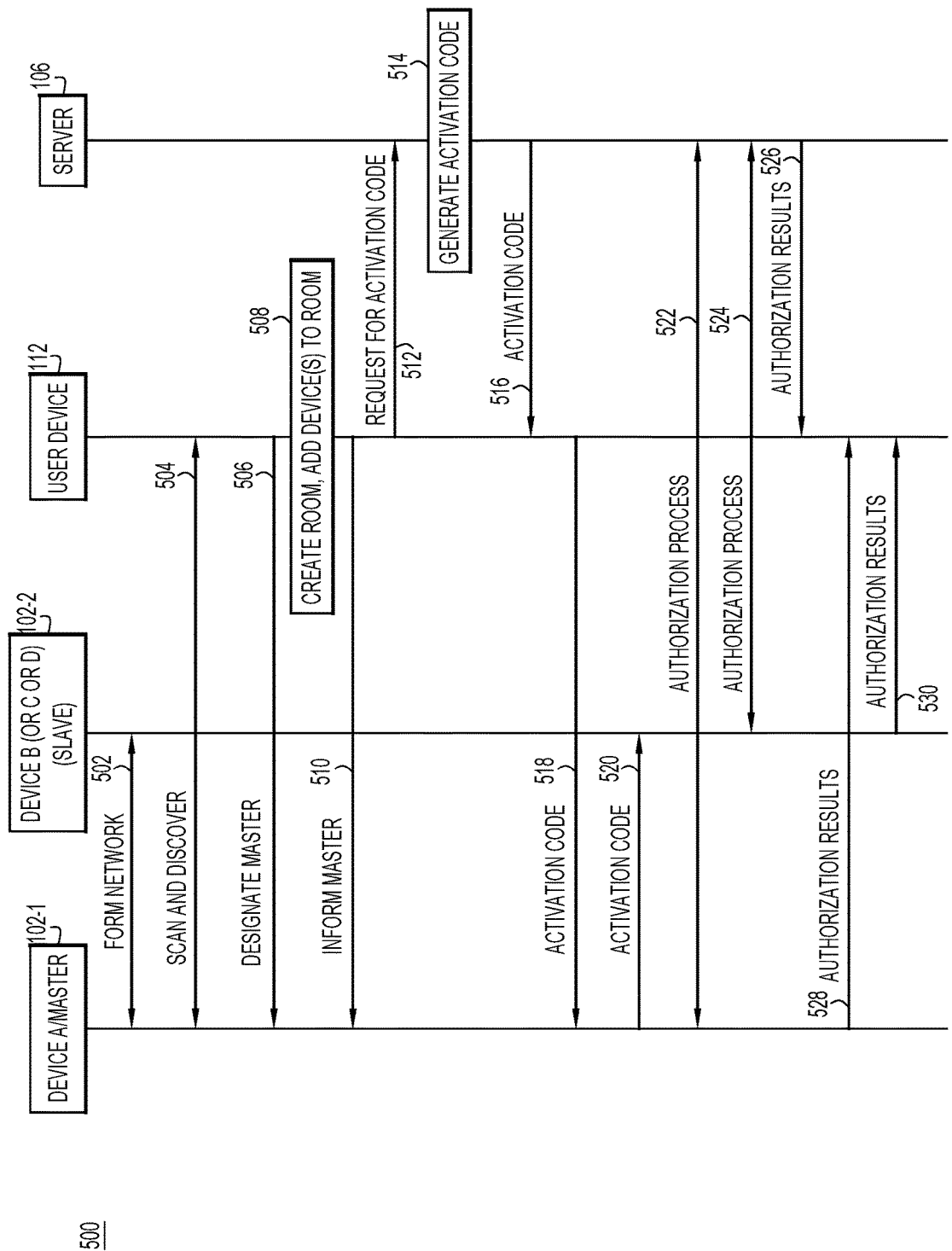
FIG. 5A is a sequence diagram illustrating a method for activating conference room devices for use in a conference room, according to an example embodiment.

Techniques presented herein allow a user to prepare conference room devices ready for a meeting with fewer manual steps and flexibility to select needed conference room devices. With reference to FIG. 5A and continuing reference to FIGS. 1-4, an example method for managing conference room devices according to one embodiment is described. FIG. 5A is a sequence diagram illustrating a method 500 for activating conference room devices for use in a conference room, according to an example embodiment. At the outset, each of the conference room devices in conference room 104 is capable of forming a wired or wireless network. Referring to FIG. 5A, at 502, Devices A, B, C, and D form a network. For example, Devices A, B, C, and D may form a wired or wireless network employing techniques such as Bluetooth®, Wi-Fi®, Near Field Communication, ultrasound, etc. A user responsible for preparing conference room devices for a meeting may walk into the conference room 104 with the user device 112. At 504, the conference room management application 114 uses the user device 112 to scan to discover available devices near the user device 112. For example, the conference room management application 114 may cause the user device 112 to broadcast a discovery signal and receives responses to the discovery signal from nearby conference room devices, Devices A, B, C, and D, or other conference room devices in another room. In another example, the conference room management application 114 may cause the user device 112 to receive beacon signals transmitted from nearby conference room devices to discover those conference room devices.

Once the scanning/discovering is complete, the conference room management application 114 causes the user device 112 to display a user interface 602 as shown in FIG. 6A. The user interface 602 includes a first column 604 that allows the user to select/designate a conference room device as a master node of an ad hoc group of conference room devices, a second column 606 that allows the user to select slave node(s) to the ad hoc group, a third column 608 showing names or identifiers of conference room devices discovered during the scan, and a fourth column 610 indicating the location of each discovered conference room device. It should be understood that more information regarding the discovered conference room devices could be displayed in the user interface 602, such as their functions or capabilities. As shown in FIG. 6A, the result of the scan/discover may include devices in the conference room 104, such as Devices A, B, C, and D that the user intends to prepare for a meeting, and devices from nearby conference rooms, such as Devices E and F from room 120 and Device G from room 150. In some embodiments, the names/identifiers of the conference room devices and their locations are included in a response signal that the conference room devices transmit to the user device 112 in response to the scan/discovery signal.

Referring back to FIG. 5A, at 506 the user device running the conference room management application 114 receives a user input selecting/designating a master node for an ad hoc group of conference room devices, and connects to the selected device, e.g., Device A. At 508, the user device 112 receives further user inputs to create a conference room (ad hoc group) by, e.g., giving a name or identifier for the ad hoc group and to add more devices to the ad hoc group. In some embodiments, the user device 112 may automatically assign an identifier for the ad hoc group. For example, the user device 112 receives user inputs to add Devices B and C to the ad hoc group as shown in FIG. 6B, e.g., Devices B and C being selected as slave nodes. Although Device D is also in conference room 104, the user does not select it based on the needs for the meeting so that Device D is not included in the ad hoc group.

Referring back to FIG. 5A, at 510 the user device 112 inform the master node, i.e., Device A, of the name/identifier of the ad hoc group and additional devices to join the ad hoc group, i.e., Devices B and C in this example.

At 512, the user device 112 logs in the remote server 106 with the user's credentials and sends a request to the remote server 106 for an activation code for the ad hoc group or a different activation code for each of the conference room devices in the ad hoc group. For example, the user device 112 may use Representational State Transfer (REST) Application Programming Interface (API) to log in the remote server 106 with the user's credentials. The activation code(s) is configured to activate conference room devices for use in a conference room. The request for the activation code(s) may include an identifier of the ad hoc group. At 514, upon receipt of the request for activation code(s), the remote server 106 executes its activation code generation logic 408 to generate an activation code for the ad hoc group or an activation code for each of the conference room devices in the ad hoc group. In one example, the activation code(s) takes the form of a combination of numbers, letters, and/or special characters. The remote server 106 stores the generated activation code(s) and associates the activation code(s) with the identifier of the ad hoc group. At 516, the remote server 106 transmits the activation code(s) to the user device 112. At 518, after receiving the activation code(s), the user device 112 forwards the activation code(s) to master node (Device A) to enable the master node to forward an activation code to each of other devices in the ad hoc group. In one embodiment, the user device 112 may invoke REST API in communicating with the conference room devices and the remote server.

At 520, after receiving the activation code(s), Device A forwards the activation code(s) to other conference room devices in the ad hoc group, e.g., Devices B and C. In some embodiments, Device A forwards a different activation code to each of the other conference room devices. At 522, Device A performs an authorization process with the remote server 106 using the activation code it receives from the user device 112. At 524, each of Devices B and C individually performs an authorization process with the remote server 106 using the activation code it receives from the master node, Device A. Specifically at 522 and 524, each of the Devices A, B, and C generates and transmits a request for authorization to be activated for use in the conference room 104, to the remote server 106. The requests from Devices A, B, and C may include the activation code and/or an identifier of the ad hoc group. Upon receiving the requests for authorization, the remote server 106 determines whether an activation code included in the requests matches the activation code it generated for the ad hoc group. If the received activation code(s) matches the activation code(s) for the ad hoc group, the remote server 106 authorizes the requesting device to be activated for use in the conference room. Otherwise, the remote server 106 denies authorization such that the requesting device would not be activated for use in the conference room. That is, although a conference room device is physically present in the conference room, it cannot be used during the conference session if it is not authorized. For example, a camera may be present in the conference room. Without being activated/authorized, the camera cannot be used for a communication session performed in the conference room. In some embodiments, the remote server 106 may enable Devices A, B, and C to participate in a multimedia collaboration session as a single logical endpoint.

At 526, the remote server 106 transmits a notification to the user device indicating the authorization results, e.g., whether a device has been authorized for use in a conference room. Additionally or alternatively, at 528 and 530, each of the conference room devices may report its authorization results to the user device 112.

Figure 5B:
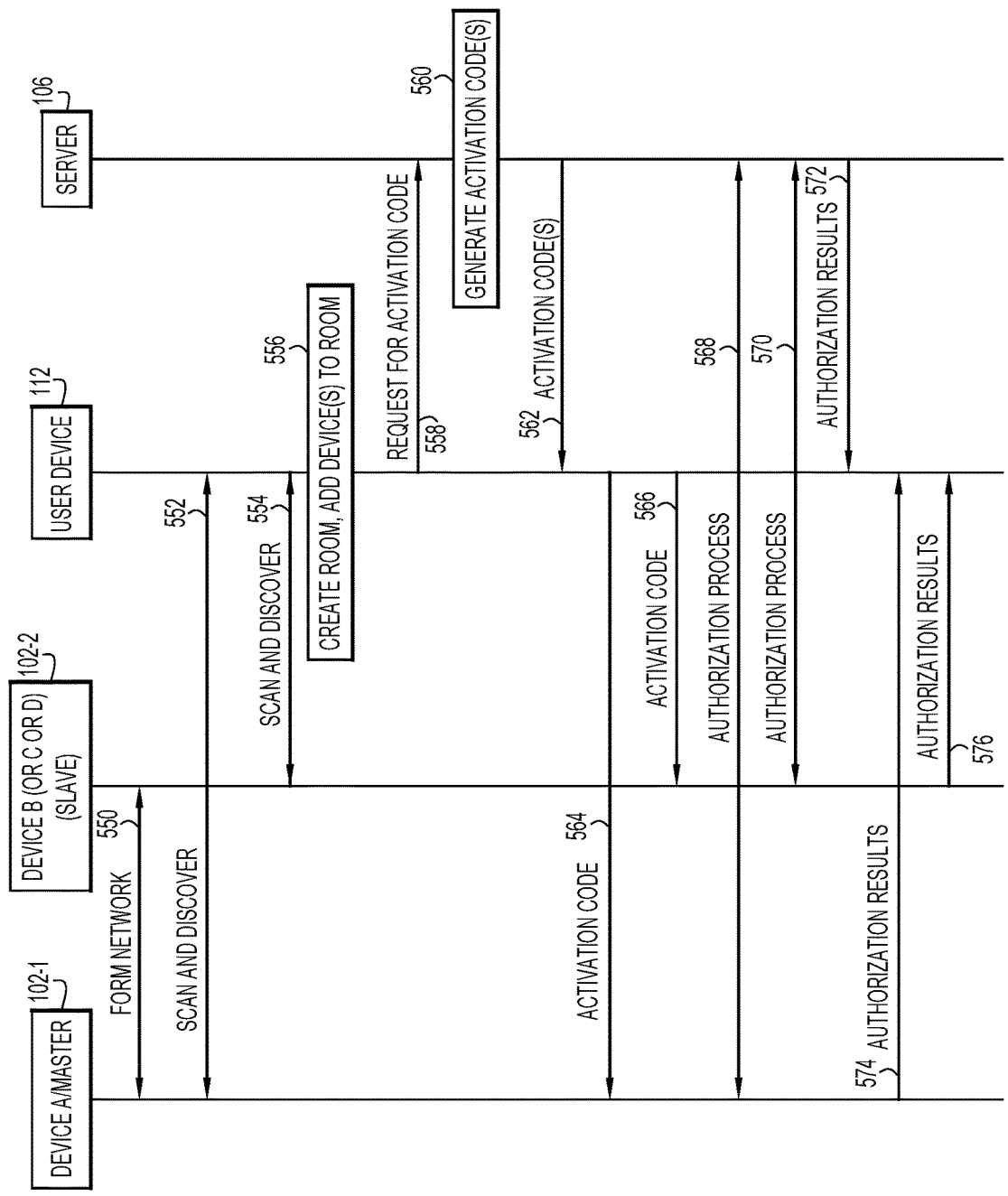
FIG. 5B is a sequence diagram illustrating another method for activating conference room devices for use in a conference room, according to an example embodiment.

FIG. 5B is a sequence diagram illustrating a method 501 for activating conference room devices for use in a conference room, according to an example embodiment. At the outset, each of the conference room devices in conference room 104 is capable of forming a wired or wireless network. Referring to FIG. 5B, at 550, Devices A, B, C, and D form a network. For example, Devices A, B, C, and D may form a wired or wireless network employing techniques such as Bluetooth®, Wi-Fi®, Near Field Communication, ultrasound, etc. A user responsible for preparing conference room devices for a meeting may walk into the conference room 104 with user device 112. At 552 and 554, the conference room management application 114 uses the user device 112 to scan to discover available devices near the user device 112. For example, the conference room management application 114 may cause the user device 112 to broadcast a discovery signal and receives responses to the discovery signal from nearby conference room devices, Devices A, B, C, and D, or other conference room devices in another room. In another example, the conference room management application 114 may cause the user device 112 to receive deacon signals transmitted from nearby conference room devices to discover those conference room devices.

Once the scanning/discovering is complete, the conference room management application 114 causes the user device 112 to display a user interface 602 as shown in FIG. 6A. Referring back to FIG. 5B, at 556, the user device 112 receives user inputs to create a conference room (ad hoc group) by, e.g., giving a name or identifier for the ad hoc group and selecting devices for the ad hoc group. In some embodiments, the user device 112 may automatically assign an identifier for the ad hoc group. For example, the user device 112 receives user inputs selecting Devices A, B, and C for the ad hoc group as shown in FIG. 6B. Although Device D is also in conference room 104, the user does not select it based on the needs for the meeting so that Device D is not included in the ad hoc group.

Referring back to FIG. 5B, at 558, the user device 112 logs in the remote server 106 with the user's credentials and sends a request to the remote server 106 for an activation code for the ad hoc group or a different activation code for each of the conference room devices in the ad hoc group. The activation code(s) is configured to activate conference room devices for use in a conference room. The request for the activation code(s) may include an identifier of the ad hoc group. At 560, upon receipt of the request for activation code(s), the remote server 106 executes its activation code generation logic 408 to generate an activation code for the ad hoc group or an activation code for each of the conference room devices in the ad hoc group. The remote server 106 stores the generated activation code(s) and associates the activation code(s) with the identifier of the ad hoc group. At 562, the remote server 106 transmits the activation code(s) to the user device 112. At 564 and 566, after receiving the activation code(s), the user device 112 forwards the activation code(s) to the conference room devices, respectively, in the ad hoc group.

At 568 and 570, each of Devices A, B, and C performs an authorization process with the remote server 106 using the activation code each of them receives from the user device 112. Specifically, at 568 and 570, each of the Devices A, B, and C generates and transmits a request for authorization to be activated for use in the conference room 104, to the remote server 106. The requests from Devices A, B, and C may include the activation code and/or an identifier of the ad hoc group and/or their individual device identifier. Upon receiving the requests for authorization, the remote server 106 determines whether an activation code included in the requests matches the activation code it generated for the ad hoc group or the individual device. If the received activation code(s) matches the activation code(s) for the ad hoc group or the individual device, the remote server 106 authorizes the requesting device to be activated for use in the conference room. Otherwise, the remote server 106 denies authorization such that the requesting device would not be activated for use in the conference room.

At 572, the remote server 106 transmits a notification to the user device indicating the authorization results, e.g., whether a device has been authorized for use in a conference room. Additionally or alternatively, at 574 and 576, each of the conference room devices may report its authorization results to the user device 112.

The techniques described above allow a user responsible for preparing a conference room to set up conference room devices with less pre-meeting planning and manual involvement. The user may walk into a conference room with a user device, such as a SmartPhone, and determine what conference room devices are needed. The user can start a conference room management application on the user device, which scans to discover available conference room devices nearby and displays them for the user to select. The user then selects a master node/device, creates an ad hoc group, and selects one or more slave nodes to be added to the ad hoc group on site. Thereafter, the user may view an authorization report on the user device to know if the selected devices have been activated for use in the conference room. This reduces initial upfront planning to provision conference room devices for use and the number of steps to activate multiple devices. Further, the user can select all of the devices needed and activate them all in simple steps.

Figure 7:
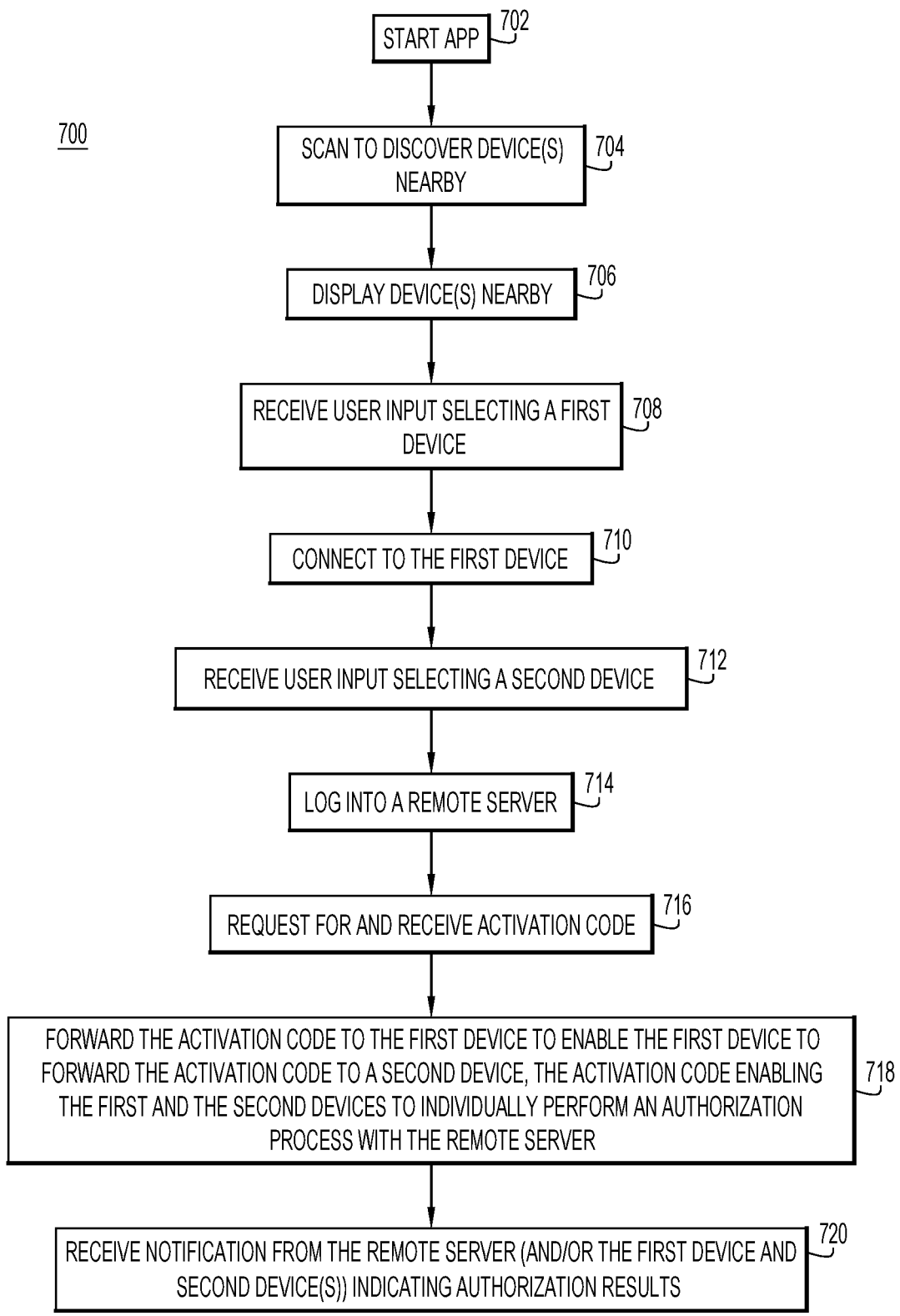
FIG. 7 is a flow chart of a method performed by a user device for managing conference room devices, according to an example embodiment.

FIG. 7 is a flow chart illustrating a method 700 performed by a user device, for managing conference room devices according to an example embodiment. At 702, the user device starts a conference room management application. At 704, the user device scans its surroundings to discover available conference room devices. For example, once the conference room management application is started, it instructs the user device to wirelessly broadcast a discovery message. The user device then receives responses from conference room devices that receives the broadcasted message. The responses may include names, identifiers, capabilities, and/or locations (e.g., room number) of the responding conference room devices. At 706, the user device compiles the responses and presents them in a user interface for the user to view. At 708, the user device receives a first user input indicating a selection of a first device as a master node among a plurality of conference room devices. In response, at 710 the user device connects to the selected first device to designate the first device as the master node of an ad hoc group.

At 712, the user device receives a second user input indicating a selection of one or more second devices as slave nodes for use in the conference room, and transmits a signal indicating the selection to the first device so that the first device adds the selected second device(s) to the ad hoc group and forms an ad hoc network with the selected second devices. In some embodiment, the user device may assign a unique identifier for the ad hoc group. At 714, the user device logs into a remote server responsible for activating conference devices, with the user's credential. At 716, the user device sends a request for an activation code for the ad hoc group and receives an activation code from the remote server. In one embodiment, the request for an activation code may include an identifier of the ad hoc group. At 718, the user device sets up the first device and the second device(s) for use in the conference room by forwarding the activation code(s) to the first device to enable the first device to forward the activation code(s) to the second device(s). The activation code(s) enables the first device and the second device(s) to individually perform an authorization process with the remote server. At 720, the user device receives a notification from the remote server indicating a result of authorization, i.e., whether the first device and the second device(s) are successfully authorized for use. Additionally or alternatively, at 720 the user device receives a notification from each of the first device and the second device(s) indicating a result of authorization.

Figure 8:
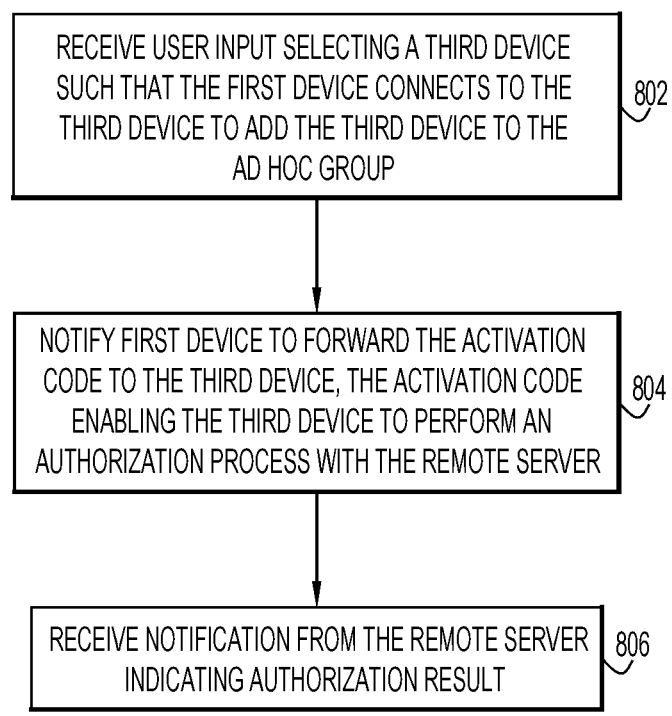
FIG. 8 is a flow chart of a method for allowing a user to add conference devices to an existing group of conference room devices, according to an example embodiment.

In some embodiments, before the conference begins or during the conference, the user may need to activate an additional third device for use in the conference room. FIG. 8 is a flow chart illustrating a method 800 for allowing a user to add more conference devices to an existing ad hoc group, according to an example embodiment. At 802, the user device of the user receives a user input indicating a selection of a third device to be added to the ad hoc group that already includes the first device (master node) and the second device(s) (slave node(s)). The user device transmits a signal to the first device indicating the selection of the third device such that the first device adds the third device to the ad hoc group and connects to the third device. At 804, the user device notifies the first device to forward the activation code for the ad hoc group to the third device so that the third device can perform an authorization process with the remote server. At 806, the user device receives a notification from the remote server indicating a result of authorization, i.e., whether the third device is successfully authorized for use.

Figure 9:
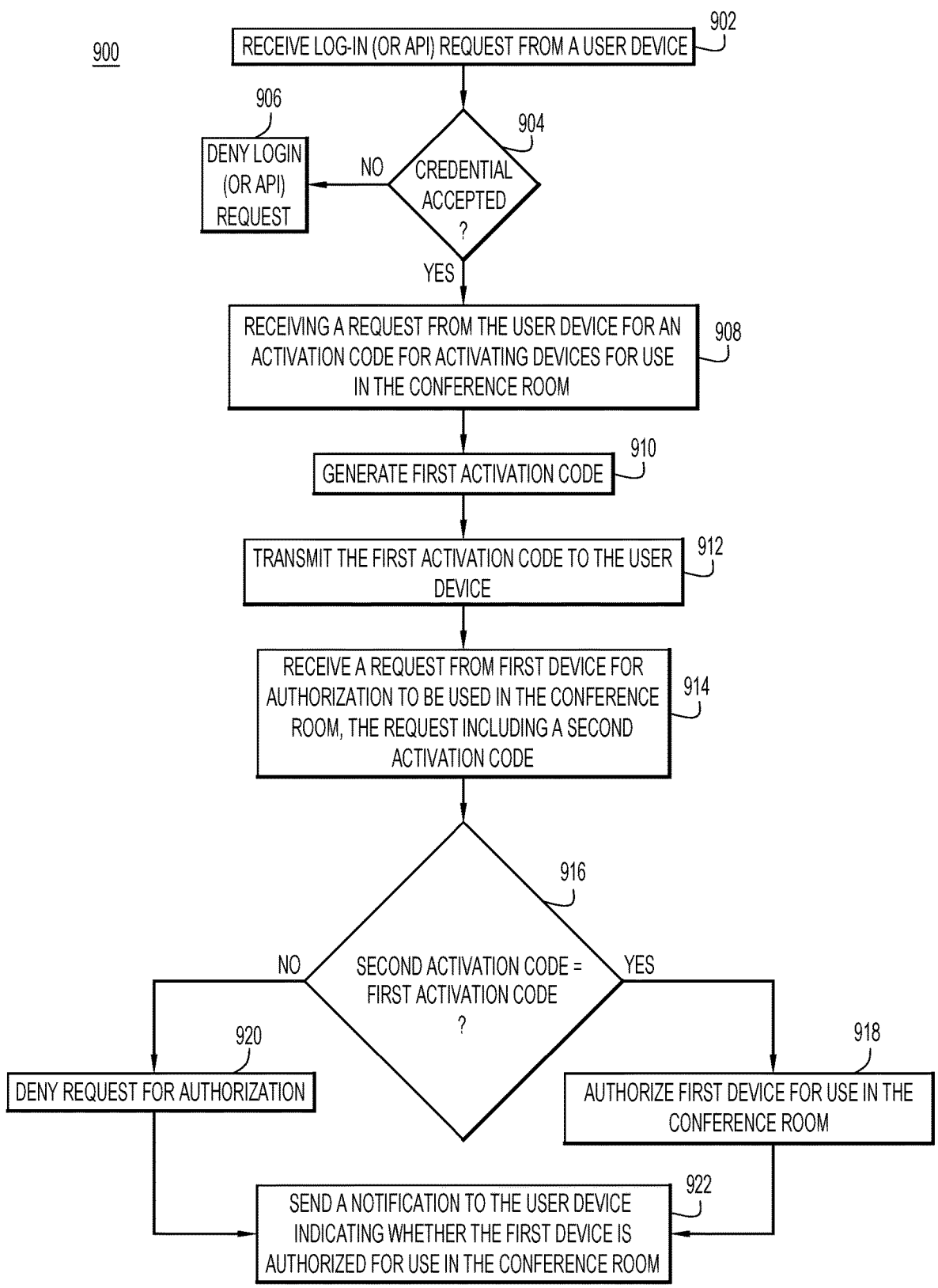
FIG. 9 is a flow chart of a method performed by a remote server for authorizing conference devices for us in a conference room, according to an example embodiment.

FIG. 9 is a flow chart illustrating a method 900 performed by a remote server for authorizing conference devices for us in a conference room. At 902, the remote server receives a request from a user device to log into the remote server. In some embodiments, the request may be an API request. At 904, the remote server determines whether the login credential is authorized to use its services. If the login credential is not authorized ("No" at 904), at 906 the remote server denies the log-in (or API) request. If the login credential is authorized ("Yes" at 904), at 908 the remote server continues transactions with the user device to receive a request for an activation code for activating conference room devices belonging to an ad hoc group for use in a conference room. The request for an activation code may include an identifier of the ad hoc group. At 910, the remote server generates a first activation code for the ad hoc group. At 912, the remote server transmits the first activation code to the user device. At 914, the remote server receives a request from a first device in a conference room for authorization to be activated/used in the conference room. The request for authorization includes a second activation code and an ad hoc group identifier. At 916, the remote server determines whether to authorize the first device for use in the conference room based on the second activation code. Specifically, at 916 the remote server determines whether the second activation code matches the first activation code that the remote server generated for the ad hoc group. In one embodiment, after receiving the request for authorization, the remote server retrieves the first activation code based on the received identifier of the ad hoc group and compares the received second activation code with the first activation code. If they match with each other ("Yes" at 916), at 918 the remote server authorizes the first device for use in the conference room. If the received second activation code does not match the first activation code ("No" at 916), at 920 the remote server denies the request for authorization from the first device. At 922, the remote server sends to the user device a notification indicating whether the first device is authorized for use in the conference room.

Figure 10:
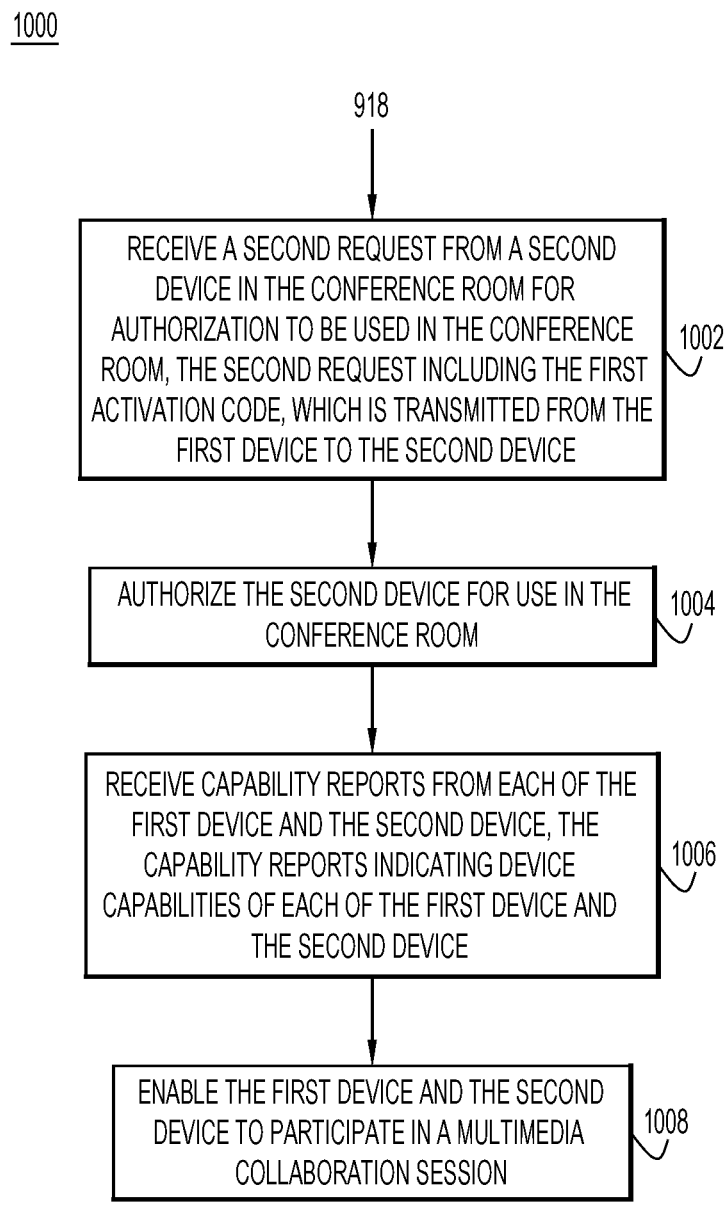
FIG. 10 is a flow chart of a method performed by a remote server for authorizing multiple conference room devices for use in the conference room, according to an example embodiment.

In some embodiments, the remote server may receive multiple requests from conferences room devices for authorization to be used in the conference room. FIG. 10 is a flow chart illustrating a method 1000 performed by the remote server for authorizing multiple conference room devices for use in the conference room, according to an example embodiment. After step 918 (FIG. 9), at 1002, the remote server receives a second request for authorization from a second device in to be used in the conference room. The second request includes the identifier of the ad hoc group that includes the first device and the first activation code for the ad hoc group. Because the second request from the second device includes the correct activation code, i.e., the first activation code, at 1004 the remote server authorizes the second device for use in the conference room.

In some embodiments, at 1006, the remote server receives capability reports from each of the devices in the ad hoc group. The capability reports show capabilities of each of the devices. For example, a camera may report to the remote server that it can capture images or videos; a speaker may report that it can replay audio data; a microphone may report that it can capture audio data; and a touch screen may report that it can receive touch inputs and display text or images for the conference. In 1008, the remote server enables the first device and second device to participate in a multimedia collaboration session. For example, the remote server may receive meeting content that includes audio and video data and transmit them to a speaker and a display, respectively. The speaker and the display then replay the audio and video data in the conference room. In some embodiments, the remote server enables the first device and second device to participate in a multimedia collaboration session as a single logical endpoint.

Figure 11:
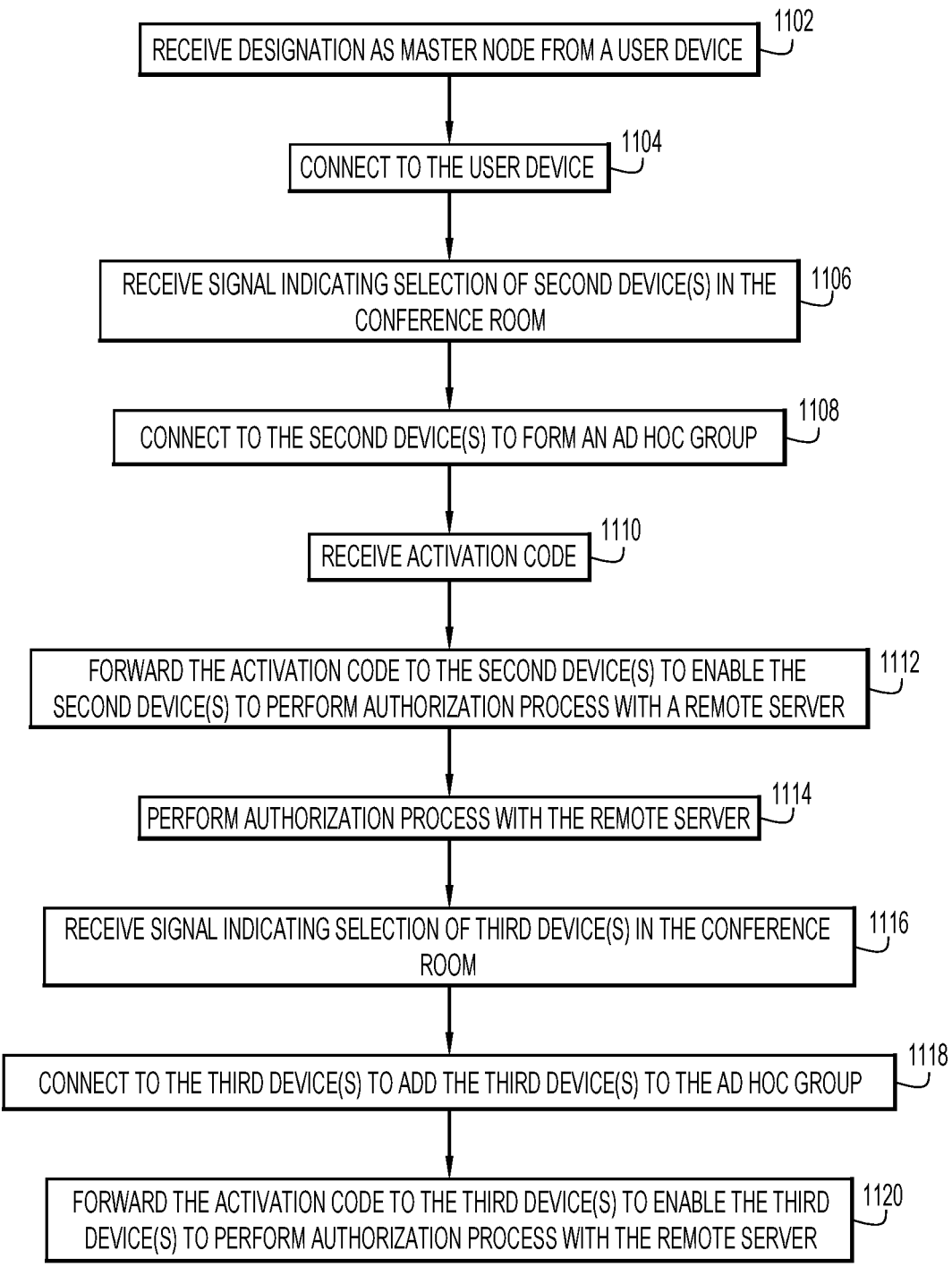
FIG. 11 is a flow chart of a method performed by a master node of an ad hoc group of conference room devices for onboarding conference room devices, according to an example embodiment.

FIG. 11 is a flow chart illustrating a method 1100 performed by a master node of an ad hoc group of conference room devices according to an example embodiment. At 1102, a first device receives a notice from a user device designating it as a master node in the conference room. The first device is one of the conference room devices placed in the conference room. At 1104, the first device establishes a connection to the user device. At 1006, the first device receives from the user device a signal indicating a selection of second device(s) in the conference room. In response, at 1008 the first device connects to the selected second device(s) to form an ad hoc group in which the first device acts as a master node and the second device(s) acts as a slave node(s). At 1110, the first device receives an activation code or codes from the user device. At 1112, the first device forwards the activation code(s) to the second device(s) in the ad hoc group, to enable the second device(s) to perform an authorization process with a remote server. At 1114, the first device performs an authorization process with the remote server using the activation code. If the authorization process is successful, the first device is authorized to be used in the conference room for a meeting.

In some embodiments, the method 1100 may include additional steps performed by the first device to add one or more devices to the ad hoc group after the ad hoc group is formed. For example, at 1116 the first device receives from the user device a signal indicating a selection of third device(s) in the conference room. In response, at 1118, the first device connects to the third device(s) to add the third device(s) to the ad hoc group. At 1120, the first device forwards the activation code to the third device(s) to enable the third device(s) to perform an authorization process with the remote server.

Figure 12:
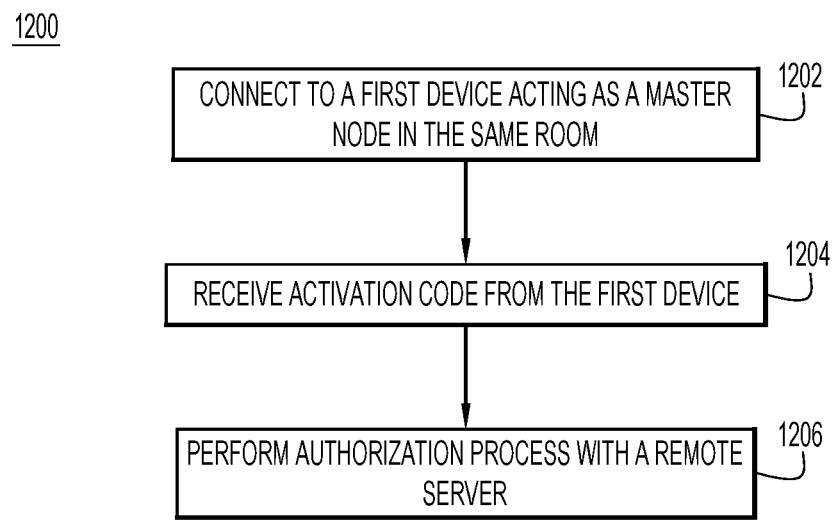
FIG. 12 is a flow chart illustrating a method performed by a slave node of an ad hoc group of conference room devices for onboarding conference room devices, according to an example embodiment.

FIG. 12 is a flow chart illustrating a method 1200 performed by a slave node of an ad hoc group of conference room devices according to an example embodiment. At 1202, a second device (slave node) connects to a first device (master node) in the same conference room. At 1204, the second device receives an activation code from the first device. At 1206, the second device performs an authorization process with a remote server using the received activation code. If the authorization process is successfully, the second device is authorized to be used in the conference room for a meeting.

It should be understood that the sequence presented in the methods explained above may be modified and is not limited to those disclosed herein.

Techniques presented herein allow a user responsible to onboard conference room devices for use in a conference to power on the device and onboard devices in a seamless way by assigning a master and selecting a set of desired devices. These techniques reduce the need for initial planning to provision multiple devices in a room based on its size and furniture settings. The user can walk in a conference room and decide what devices are needed, and then seamlessly add and activate a set of devices for the room. This reduces or eliminates manual steps and provides flexibility for the user to activating a plurality of device at once. Moreover, techniques presented herein allow the user to activate/onboard additional device(s) before the meeting starts or during the meeting, after the initial activation of conference room device has completed. In some embodiments, these techniques allow small, inexpensive devices to work collaboratively to provide a good meeting experience in meeting rooms.

In summary, in one aspect, a method is provided, in which a user device runs an application to display a plurality of devices available for use in a conference room. Each of the plurality of devices is capable of wirelessly connecting to each other. The method includes: receiving a first user input selecting a first one of the plurality of devices in the conference room; in response to the first user input, connecting the user device with the first one of the plurality of devices; receiving a second user input selecting a second one of the plurality of devices in the conference room such that the first one of the plurality of devices connects to the second one of the plurality of devices to form an ad hoc group; logging into a remote server to receive an activation code for the ad hoc group; and setting up the first one and the second one of the plurality of devices for use in the conference room by forwarding the activation code to the first one of the plurality of devices to enable the first one of the plurality of devices to forward the activation code to the second one of the plurality of devices, the activation code enabling the first one and the second one of the plurality of devices to individually perform an authorization process with the remote server.

In another aspect, a method is provided, in which a server is configured to onboard devices in a conference room. The method includes: receiving a log-in request from a user device; receiving a request from the user device for a first activation code for activating devices for use in the conference room; transmitting the first activation code to the user device; receiving a first request from a first device in the conference room for authorization to be used in the conference room, the first request including a second activation code; and determining whether to authorize the first device for use in the conference room based on the second activation code.

In yet another aspect, an apparatus is provided, which includes a communication interface that enables network communications, a processor, and a memory to store data and instructions executable by the processor. The processor is configured to execute the instructions to: receive a log-in request from a user device; receive a request from the user device for a first activation code for activating devices for use in the conference room; transmit the first activation code to the user device; receive a first request from a first device in the conference room for authorization to be used in the conference room, the first request including a second activation code; determine whether to authorize the first device for use in the conference room based on the second activation code.

The above description is intended by way of example only. Various modifications and structural changes may be made therein without departing from the scope of the concepts described herein and within the scope and range of equivalents of the claims.

What is claimed is:

1. A method comprising:
at a user device running an application to display a plurality of devices available for use in a conference room, each of the plurality of devices being capable of wirelessly connecting to each other:
receiving a first user input selecting a first device of the plurality of devices in the conference room such that the first device is designated as a master node;
sending, to the first device, an indication that the first device is designated as the master node;
establishing a connection with the first device;
receiving a second user input selecting a second device of the plurality of devices in the conference room such that the second device is designated as a slave node;
sending, to the first device, a signal indicating a selection of the second device such that the first device connects to the second device to form an ad hoc group in which the first device acts as the master node and the second device acts as the slave node;
logging into a remote server to receive an activation code for the ad hoc group; and
setting up the first device and the second device for use in the conference room by forwarding the activation code to the first device to enable the first device to forward the activation code to the second device, the activation code enabling the first device and the second device to individually perform an authorization process with the remote server.

2. The method of claim 1, further comprising:
receiving a result of the authorization process from the remote server.

3. The method of claim 1, further comprising:
receiving a third user input selecting a third device of the plurality of devices in the conference room such that the first device connects to the third device to add the third device to the ad hoc group; and setting up the third device for use in the conference room by notifying the first device to forward the activation code to the third device, the activation code enabling the third device to perform the authorization process with the remote server.

4. The method of claim 1, further comprising:
receiving a fourth user input to name the conference room.

5. The method of claim 1, further comprising:
scanning to discover the plurality of devices available for use in the conference room.

6. The method of claim 1, wherein the user device is a mobile device.

7. The method of claim 1, wherein completion of the authorization process allows the first device and the second device to participate in a multimedia collaboration session without the user device participating in the multimedia collaboration session.

8. An apparatus comprising:
a communication interface that enables network communications;
a processor; and
a memory to store data and instructions executable by the processor, wherein the processor is configured to execute the instructions to:
receive a first user input selecting a first device from a plurality of devices in a conference room such that the first device is designated as a master node, each of the plurality of devices being capable of wirelessly connecting to each other;
send, to the first device, an indication that the first device is designated as the master node;
in response to the first user input, connect with the first device;
receive a second user input selecting a second device of the plurality of devices in the conference room such that the second device is designated as a slave node;
send, to the first device, a signal indicating a selection of the second device such that the first device connects to the second device to form an ad hoc group in which the first device acts as the master node and the second device acts as the slave node;
log into a remote server to receive an activation code for the ad hoc group; and
set up the first device and the second device for use in the conference room by forwarding the activation code to the first device to enable the first device to forward the activation code to the second device, the activation code enabling the first device and the second device to individually perform an authorization process with the remote server.

9. The apparatus of claim 8, wherein the processor is further configured to execute the instructions to:
receive a result of the authorization process from the remote server.

10. The apparatus of claim 8, wherein the processor is further configured to execute the instructions to:
receive a third user input selecting a third device of the plurality of devices in the conference room such that the first device connects to the third device to add the third device to the ad hoc group; and
set up the third device for use in the conference room by notifying the first device to forward the activation code to the third device, the activation code enabling the third device to perform the authorization process with the remote server.

11. The apparatus of claim 8, wherein the processor is further configured to execute the instructions to:
receive a fourth user input to name the conference room.

12. The apparatus of claim 8, wherein the processor is further configured to execute the instructions to:
scan to discover the plurality of devices available for use in the conference room.

13. The apparatus of claim 8, wherein the apparatus is a mobile device.

14. The apparatus of claim 8, wherein completion of the authorization process allows the first device and the second device to participate in a multimedia collaboration session without the apparatus participating in the multimedia collaboration session.

15. A non-transitory computer-readable storage media encoded with software comprising computer executable instructions and, when the software is executed, the software is operable to:
receive a first user input selecting a first device from a plurality of devices in a conference room such that the first device is designated as a master node, each of the plurality of devices being capable of wirelessly connecting to each other;
send, to the first device, an indication that the first device is designated as the master node;
in response to the first user input, connect with the first device;
receive a second user input selecting a second device of the plurality of devices in the conference room such that the second device is designated as a slave node;
send, to the first device, a signal indicating a selection of the second device such that the first device connects to the second device to form an ad hoc group in which the first device acts as the master node and the second device acts as the slave node;
log into a remote server to receive an activation code for the ad hoc group; and
set up the first device and the second device for use in the conference room by forwarding the activation code to the first device to enable the first device to forward the activation code to the second device, the activation code enabling the first device and the second device to individually perform an authorization process with the remote server.

16. The non-transitory computer-readable storage media of claim 15, wherein when the software is executed, the software is further operable to:
receive a result of the authorization process from the remote server.

17. The non-transitory computer-readable storage media of claim 15, wherein when the software is executed, the software is further operable to:
receive a third user input selecting a third device of the plurality of devices in the conference room such that the first device connects to the third device to add the third device to the ad hoc group; and
set up the third device for use in the conference room by notifying the first device to forward the activation code to the third device, the activation code enabling the third device to perform the authorization process with the remote server.

18. The non-transitory computer-readable storage media of claim 15, wherein when the software is executed, the software is further operable to:

receive a fourth user input to name the conference room.

19. The non-transitory computer-readable storage media of claim 15, wherein when the software is executed, the software is further operable to:
    scan to discover the plurality of devices available for use in the conference room.

20. The non-transitory computer-readable storage media of claim 15, wherein completion of the authorization process allows the first device and the second device to participate in a multimedia collaboration session without a user device that is executing the software participating in the multimedia collaboration session.

\* \* \* \* \*